United States Patent
Albert et al.

(10) Patent No.: US 10,266,655 B2
(45) Date of Patent: Apr. 23, 2019

(54) AQUEOUS COMPOSITION COMPRISING [3-(2,3-DIHYDROXYPROP-1-OXY)PROPYL] SILANOL OLIGOMERS, PROCESS FOR PREPARATION THEREOF AND USE THEREOF

(71) Applicant: Evonik Degussa GmbH, Essen (DE)

(72) Inventors: Philipp Albert, Rheinfelden (DE);
Julia Kirberg, Rheinfelden (DE);
Jennifer Schrantz, Rheinfelden (DE);
Eckhard Just, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 1 day.

(21) Appl. No.: 15/530,148

(22) Filed: Dec. 8, 2016

(65) Prior Publication Data

US 2017/0166702 A1    Jun. 15, 2017

(30) Foreign Application Priority Data

Dec. 8, 2015 (EP) ..................................... 15198353

(51) Int. Cl.
*C08G 77/18* (2006.01)
*C09D 163/00* (2006.01)
(Continued)

(52) U.S. Cl.
CPC .............. *C08G 77/18* (2013.01); *C08L 83/04* (2013.01); *C08L 83/06* (2013.01); *C09D 7/65* (2018.01);
(Continued)

(58) Field of Classification Search
CPC .......... C08L 73/06; C08L 83/04; C08L 83/06; C08L 63/00–63/10; C08G 77/045;
(Continued)

(56) References Cited

U.S. PATENT DOCUMENTS

| 4,463,114 A | * | 7/1984 | Balchunis | ................ | C09D 4/00 |
| | | | | | 428/447 |
| 5,885,341 A | * | 3/1999 | Standke | ................ | C08G 77/18 |
| | | | | | 106/287.11 |

(Continued)

FOREIGN PATENT DOCUMENTS

| DE | 10 2007 045 186 A1 | 4/2009 |
| EP | 0 892 911 A1 | 1/1999 |

OTHER PUBLICATIONS

European Search Report dated Jun. 15, 2016 in Patent Application No. 15198353.3 (with English translation of categories of cited documents).

*Primary Examiner* — Kregg T Brooks
(74) *Attorney, Agent, or Firm* — Grüneberg and Myers PLLC

(57) ABSTRACT

The present invention relates to a composition comprising water and a mixture of [3-(2,3-dihydroxyprop-1-oxy)propyl]silanol oligomers and ethers thereof, wherein the proportion of epoxy groups bound within Si compounds which may be present in the composition is not more than 0.05 mol of epoxy groups per mole of Si in the composition.
The invention further relates to a particular process for preparing a composition according to the invention and to the use thereof.

12 Claims, 1 Drawing Sheet

Positions in hydrolysed GLYMO

(51) Int. Cl.
*C08L 83/04* (2006.01)
*C08L 83/06* (2006.01)
*C08L 63/00* (2006.01)
*C08G 77/04* (2006.01)
*C08G 77/14* (2006.01)
*C08G 77/16* (2006.01)
*C09D 7/65* (2018.01)

(52) U.S. Cl.
CPC ......... *C09D 163/00* (2013.01); *C08G 77/045* (2013.01); *C08G 77/14* (2013.01); *C08G 77/16* (2013.01)

(58) Field of Classification Search
CPC ........ C08G 77/14; C08G 77/16; C08G 77/18; C09D 163/00–163/10; C09D 183/04; C09D 183/06; C09J 163/00–163/10; C09J 183/04; C09J 183/06
See application file for complete search history.

(56) References Cited

U.S. PATENT DOCUMENTS 6,506,868 B1 * 1/2003 Goda .................. C08G 8/28
525/393
2010/0209719 A1 8/2010 Borup et al.

* cited by examiner

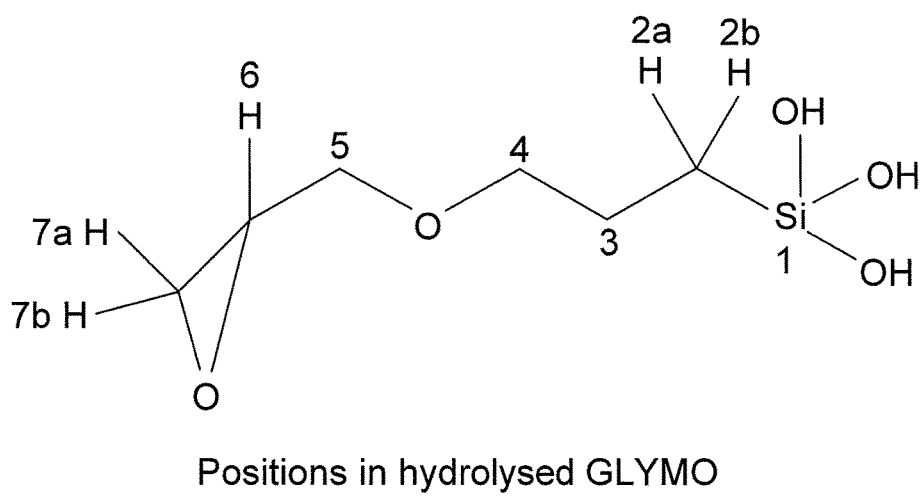
Positions in hydrolysed GLYMO

AQUEOUS COMPOSITION COMPRISING [3-(2,3-DIHYDROXYPROP-1-OXY)PROPYL] SILANOL OLIGOMERS, PROCESS FOR PREPARATION THEREOF AND USE THEREOF

BACKGROUND OF THE INVENTION

Field of the Invention

The present invention relates to a composition which comprises water and a mixture of [3-(2,3-dihydroxyprop-1-oxy)propyl]silanol oligomers and ethers thereof, wherein the proportion of epoxy groups bound within Si compounds which may be present in the composition is <5 mol %, based on the molar proportion of Si in the composition. The invention further relates to a particular process for preparing a composition according to the invention and to the use thereof.

Discussion of the Background

Organofunctional silanes are molecules that are bifunctional. The alkoxy groups on the silicon can be detached in the presence of water and catalysts. This gives rise to reactive silanol groups which can enter into a chemical bond to inorganic substrates. The organofunctional portion of the molecule is bonded to the silicon by a C—Si bond and can consist of various organofunctional groups. If the organofunctional group consists of a methyl or alkyl group only, these groups cannot enter into any chemical reaction, but they can lead to a strong hydrophobic effect according to the chain length. Therefore, alkyltrialkoxysilanes are also used for hydrophobization of surfaces. Organofunctional silanes are obtainable with different organic groups. These are, for example, primary amino groups, secondary amino groups, and glycidyl ether, methacryloyl, ureido, vinyl, mercapto and isocyanato groups. One use of silanes is as adhesion promoters. For this function, they may be part of a primer solution or else be used as additive in a paint formulation.

Discussion about VOCs does not stop short of the silanes, since the hydrolysis of methoxy- or ethoxysilanes gives rise to methanol or ethanol. Furthermore, silanes cannot be used without restriction in aqueous paint formulations because they can be subject to further hydrolysis and condensation after the paint has been formulated. This gives rise to paint formulations having only very short application times. On the one hand, the performance of the paint can deteriorate after a short time or, on the other hand, there can even be gelation. One possible solution for the stability of silanes in aqueous paint formulations could be water-based silane systems. Thus, aqueous silane systems are the subject of increasing interest, since they contain only a low level of organic solvents, if any, and are therefore more environmentally friendly. Furthermore, these systems can be used without explosion protection. Stable aqueous silane systems are not preparable simply by mixing silanes with water, since many silanes are insoluble in the aqueous phase and undergo hydrolysis and condensation on contact with water.

EP0675128 teaches a process for preparing stable aqueous silane compositions. In the process, a water-soluble silane and a water-insoluble silane are hydrolysed and condensed in a defined molar ratio. The alcohol of hydrolysis is removed from the mixture after the reaction. The aqueous silane compositions claimed contain amino groups.

EP0849332 describes a process for producing a coating. Example 3 shows a preparation scheme for a mixed 3-glycidyloxypropyltrimethoxysilane system. The mixed system contains, as a further silane, a succinic anhydride silane. The system is applied to the substrate as coating and thermally cured.

WO1991/019565 discloses an adsorption material for selective removal of lipoprotein and cholesterol from aqueous liquids, especially from blood, plasma or serum, wherein porous glass bodies serve as solid support material for the adsorption material and organic functional groups are covalently bonded as ligands (ligands=Lig) to the surface thereof. Said ligands have alkyl radicals containing at least one ethyl moiety with a terminal alpha-/beta-diol group and are bonded to the surface of the solid support material via a Lig-Si—O bond; moreover, they do not have any free silanol groups either. For production of such adsorption materials, it is possible to use 3-glycidyloxypropyltrimethoxysilane inter alia.

WO2002/050191 discloses the production of low-solvent sol-gel systems comprising the process steps of:
a) hydrolysis and condensation
b) addition of water until phase separation
c) removal of the condensate phase.

In the hydrolysis and condensation, it is also possible to use 3-glycidyloxypropyltrimethoxy- or -ethoxysilanes.

EP1599551 claims a process for coating a metallic surface with an aqueous composition containing at least one hydrolysable or partly hydrolysed silane, a metal chelate, an organic film former and a long-chain alcohol. The silane used here may also be 3-glycidyloxypropyltrimethoxy- or -ethoxysilane.

EP1599551 teaches a process for coating a metallic surface with an aqueous composition containing at least one hydrolysable or/and at least partly hydrolysed silane and at least one metal chelate.

EP1599616 discloses a process for coating a metallic surface with an aqueous composition, wherein the composition comprises at least one hydrolysable or/and at least partly hydrolysed fluorine-free silane and at least one hydrolysable or/and at least partly hydrolysed fluorine-containing silane.

WO2005/090502 describes a binder consisting of an aqueous film-forming polymeric siloxane. The binder may contain alkyl, alkenyl, methacryloyl, epoxy, mercaptan or hydroxyalkyl groups. The binder is formulated with additives and fillers and used for the corrosion protection of metals.

WO2006/010388 teaches the preparation of a binder from a glycidyloxypropyltrialkoxysilane, a silica sol, a catalyst and a propyl zirconate or butyl titanate or titanium acetylacetonate as crosslinker. The binder can be used in formulations or else for coating of a wide variety of different substrates.

WO2005/108520 discloses an adhesive/sealant composition consisting of a component A and a component B. Component A contains at least one catalyst for silane crosslinking and low molecular weight organofunctional silanes, for example 3-glycidyloxypropyltrimethoxysilane.

WO2006/079516 relates to an aqueous binder composition consisting of an epoxysilane, a formylaminopropyltrialkoxysilane and a tetraalkoxysilane. The silanes are subjected to acid hydrolysis and formulated with pigments and additives. The aqueous coating system is intended for use as a shop primer.

WO2009/021776 describes the preparation of an oligomeric epoxysilane and optionally a further silane by hydrolysis and condensation in the presence of boric acid.

EP0675128 teaches the preparation of stable water-based silane systems. In Example 3, a 3-glycidyloxypropyltrimethoxysilane is reacted with diethylene glycol and butyl titanate. The methanol formed is removed before the converted silane is hydrolysed by addition of water.

CN103509188 describes the preparation of coloured polysiloxane microparticles. For this purpose, silanes are hydrolysed in water or in a water/solvent mixture between 20 and 80° C. and a pH of 1.0 to 6.5 in the presence of an organic acid. Subsequently, the pH is adjusted to 7.1 to 13.5 with a base. After 0.1 to 24 hours, the microparticles can be removed and dried.

US2007/0179268 claims a process for preparing oligomeric epoxysilanes. Fewer than 1.5 equivalents of water are used for the hydrolysis.

WO2006/044340 teaches the production and use of an abrasion-resistant coating composition. The composition contains at least one epoxysilane.

JP54063176 claims a primer for transparent plastics, consisting of a hydrolysed epoxysilane and an aminoalkylsilane.

JP2000239644 describes the composition of a primer which also contains epoxysilanes as well as an organic solvent and water.

EP0832911 discloses organopolysiloxane-containing water-based compositions that are essentially free of organic solvents. Studies on a composition based on 3-glycidyloxypropyltrimethoxysilane prepared according to Example 1 show that the composition, as well as a high proportion of intact epoxy groups, also contains opened epoxy groups. The result is surprising.

Aqueous silane systems are becoming ever more important, since they are environmentally friendly and easy to handle. In the use of these systems, it is not normally necessary to observe any special safety precautions with regard to explosion protection. Such aqueous systems can be used as a reactive binder, co-binder, as primer and also as sealant. Silanes are very reactive and react in the presence of air humidity or water. First of all, hydrolysis takes place. This forms silanol groups which can react with inorganic or else organic substrates. Furthermore, the silanols can also react with themselves to form Si—O—Si bonds. Under appropriate conditions, significant crosslinking in the aqueous solution and hence gelation of the system can take place. If organofunctional silanes are to be used for aqueous silane systems, the stability of the organofunctional group should also be taken into account. Example 1 in EP0832911 leads to an aqueous silane system with opened and intact epoxy groups. After the synthesis, about 20-30% of the epoxy groups are still intact.

SUMMARY OF THE INVENTION

The problem addressed by the present invention, proceeding from a 3-glycidyloxypropyltrialkoxysilane, was therefore that of providing an improved aqueous composition which finds use especially in coating formulations of epoxy resins. Such aqueous compositions for coating formulations based on epoxy resins should also be stable if possible and be applicable in a user-friendly manner. The problem was simultaneously based on the desire to provide a process for preparing such an aqueous composition proceeding from a 3-glycidyloxypropyltrialkoxysilane. Moreover, such an aqueous composition should have a minimum level of VOCs.

The stated problem is advantageously solved by the invention according to the features in the present claims.

BRIEF DESCRIPTION OF THE DRAWINGS

FIG. 1 shows an $^1$H NMR (500.1 MHz, DMSO) δ [ppm] measurement of intact epoxy groups in hydrolyzed GLYMO (3-glycidyloxypropyltrimethoxysilane).

DETAILED DESCRIPTION OF THE INVENTION

Thus, in a surprising manner, a specific process for preparing a stable aqueous composition comprising water and a mixture of [3-(2,3-dihydroxyprop-1-oxy)propyl]silanol oligomers and ethers thereof has been found, wherein the proportion of epoxy groups bound within Si compounds and present in the composition is advantageously equal to or much less than 5 mol %, i.e. not more than 0.05 mol of epoxy groups per mole of Si in the aqueous composition; such epoxy-functional Si compounds are especially understood to mean feedstocks such as glycidyloxyalkylalkoxysilanes or the epoxy-functional reaction products thereof.

Furthermore, compositions according to the invention have suitably been acidified and may thus contain, as well as water and a mixture of [3-(2,3-dihydroxyprop-1-oxy)propyl]silanol oligomers and the ethers thereof, an acid, preferably an organic acid, particularly advantageously formic or acetic acid, as acid.

Such aqueous systems according to the invention are especially notable for good solubility of said [3-(2,3-dihydroxyprop-1-oxy)propyl]silanol oligomer mixtures including the ethers thereof and for their excellent storage stability compared to systems containing a much higher proportion of epoxy-functional Si compounds. Compositions of the invention are additionally advantageously dilutable with water in virtually any ratio.

Furthermore, coating formulations of epoxy resins containing a composition according to the invention have distinctly improved application properties over systems containing a much higher proportion of epoxy-functional Si compounds. Reference is made to the present application studies.

EP0832911 discloses that the workup of the reaction product, i.e. the removal of the alcohol from the product mixture, has ended after 8 hours.

By contrast and in addition, the composition according to the invention is advantageously obtainable when, in the preparation, in step 1 3-glycidyloxypropyltrimethoxysilane or 3-glycidyloxypropyltriethoxysilane or a mixture of 3-glycidyloxypropyltrimethoxysilane and 3-glycidyloxypropyltriethoxysilane is used as 3-glycidyloxypropyltrialkoxysilane and combined and mixed in the presence of an acid with a defined amount of distilled, demineralized or deionized water, for example what is called "DM water" or what is called "dist. water", within 10 to 30 minutes, the pH in the reaction mixture preferably being in the range from 2 to 4, in step 2 the reaction mixture is heated and stirred at 55 to 70° C. for 1.5 to 5 hours, then in step 3, under reduced pressure at a temperature in the range from 40 to 55° C. over at least 10 hours, preferably within 10 to 16 hours, here including the figure of 11, 12, 13 and 14 hours, an alcohol/water mixture is distilled and at the same time replaced, based on weight, with distilled, demineralized or deionized water and the distillation is conducted in this way over at least 10 hours until the top product of the distillation column ultimately contains only water, i.e. is free of alcohol.

An aqueous composition prepared in this way contains, as active ingredient, advantageously essentially said [3-(2,3-dihydroxyprop-1-oxy)propyl]silanol oligomer mixtures, i.e.

hydroxyl, ether and silanol groups but virtually no epoxy groups, and can be used as coupling reagent in primer solutions, as a sealant on inorganic substrates, as reactive binder, as co-binder for aqueous formulations in a wide variety of different sectors, but especially for the formulation of stable user-friendly 2-component epoxy resin coatings with outstanding success.

Furthermore, compositions of the invention are pourable liquids, have excellent storage stability, are miscible with water in virtually any ratio and are essentially free of sodium or potassium ions, apart from traces that are ubiquitous.

The present invention thus provides a composition comprising water and a mixture of [3-(2,3-dihydroxyprop-1-oxy)propyl]silanol oligomers and ethers thereof, wherein the proportion of epoxy groups bound within Si compounds which may be present in the composition is not more than 0.05 mol of epoxy groups per mole of Si in the composition.

Particular preference is given to aqueous compositions according to the invention, wherein the proportion of epoxy groups bound within Si compounds which may be present in the composition is 0 to not more than 0.04 mol of epoxy groups per mole of Si in the composition, especially 0.001 to 0.03 mol of epoxy functionality per mole of Si in the composition.

In addition, a composition according to the invention advantageously contains a content of formic acid or acetic acid. Preferably, aqueous compositions according to the invention have a pH of 2 to 4. The pH in a composition according to the invention can be determined, for example, by means of a glass electrode or by means of pH paper or pH test strips from Merck in a manner known per se to the person skilled in the art.

More particularly, a composition according to the invention comprises [3-(2,3-dihydroxyprop-1-oxy)propyl]silanol oligomers or ethers thereof of the general formula I

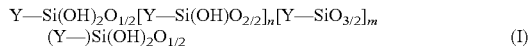

where n≥0 and m≥0, Y groups are R"O—CH$_2$—CH(OR')—CH—O—C$_3$H$_6$— and the R' and R" groups are the same or different and may be H, methyl and ethyl.

In addition, a composition according to the invention may suitably also comprise silanols of the general formula II

where Y group is R"O—CH$_2$—CH(OR')—CH—O—C$_3$H$_6$— and the R, R' and R" groups are the same or different and may be H, methyl (Me) and ethyl (Et).

Examples of silanols of formula II are:
Y—Si(OH)(OMe)$_2$, Y—Si(OMe)(OH)$_2$, Y—Si(OH)(OEt)$_2$, Y—Si(OEt)(OH)$_2$, Y—Si(OEt)(OMe)(OH), Y—Si(OH)$_3$.

Proceeding from the aforementioned formulae, the following examples of Y groups are given:
HO—CH$_2$—CH(OH)—CH—O—C$_3$H$_6$—, MeO—CH$_2$—CH(OH)—CH—O—C$_3$H$_6$—, EtO—CH$_2$—CH(OH)—CH—O—C$_3$H$_6$—,
HO—CH$_2$—CH(OMe)-CH—O—C$_3$H$_6$—, HO—CH$_2$—CH(OEt)-CH—O—C$_3$H$_6$—, MeO—CH$_2$—CH(OMe)-CH—O—C$_3$H$_6$—, EtO—CH$_2$—CH(OEt)-CH—O—C$_3$H$_6$—, MeO—CH$_2$—CH(OEt)-CH—O—C$_3$H$_6$—, EtO—CH$_2$—CH(OMe)-CH—O—C$_3$H$_6$—.

Compositions according to the invention are notable for being VOC-free; for instance, VOC-free in the present application is understood to mean that a composition according to the invention especially contains not more than 1% by weight of free alcohol, where the % by weight figure is based on the composition and the alcohol is selected from the group of methanol and ethanol.

As well as said [3-(2,3-dihydroxyprop-1-oxy)propyl]silanol oligomer mixtures including the ethers thereof, compositions according to the invention may also comprise organofunctional silanols as apparent from the above-cited formula II in a comparatively small proportion, these Si compounds overall being regarded as the active ingredient in a composition according to the invention. Thus, aqueous compositions according to the invention suitably have an active ingredient content of up to 80% by weight, based on the overall composition, preferably 5% to 80% by weight, more preferably 10% to 70% by weight, even more preferably 20% to 60% by weight, especially 30% to 50% and 40% to 50% by weight. A composition according to the invention thus advantageously has an active ingredient content of compounds of the formula I including compounds of the formula II up to 80% by weight, i.e. in total and based on the overall composition, meaning that compounds of the formula II may optionally be present as active ingredient alongside those of the formula I in a composition according to the invention.

The present invention likewise provides a process for preparing a composition according to the invention by in step 1 using 3-glycidyloxypropyltrimethoxysilane or 3-glycidyloxypropyltriethoxysilane or a mixture of 3-glycidyloxypropyltrimethoxysilane and 3-glycidyloxypropyltriethoxysilane as 3-glycidyloxypropyltrialkoxysilane and combining and mixing it in the presence of an acid with a defined amount of distilled, demineralized or deionized water within 10 to 30 minutes, in step 2 heating the reaction mixture and stirring it at 55 to 70° C. for 1.5 to 5 hours, then in step 3, under reduced pressure at a temperature in the range from 40 to 55° C. over at least 10 hours, distilling an alcohol/water mixture and at the same time replacing it, based on weight, with distilled, demineralized or deionized water and conducting the distillation over at least 10 hours until the top product of the distillation column ultimately contains only water. Compositions prepared in this way are VOC-free or essentially free of alcohol.

Preferably, in the process according to the invention, in step 1, the 3-glycidyloxypropyltrialkoxysilane and water are used in a molar ratio of 1:3 to 60, including all molar starting material ratios that the person skilled in the art is able to derive therefrom.

In addition, in the process according to the invention, in step 1, the acid used is preferably formic acid or acetic acid, preferably in a molar ratio of acid to 3-glycidyloxypropyltrialkoxysilane of 0.03 to 0.06:1, such that all molar starting material ratios that the person skilled in the art is able to derive therefrom are included here too.

In general, the process according to the invention is conducted as follows:

In step 1, the 3-glycidyloxypropyltrialkoxysilane, water and acid are combined or metered in and mixed in said ratio within a period of time of 10 to 30 minutes. For this purpose, the silane can suitably be initially charged, acid can be added in a defined amount and the amount of demineralized water required can be metered in while mixing. The pH of the reaction mixture is suitably within the range from 2 to 4. In step 2, the reaction mixture, if required, is heated and advantageously stirred at 55 to 70° C. for 1.5 to 5 hours. Subsequently, in step 3, under reduced pressure at a temperature in the range from 40 to 55° C. over at least 10 hours, an alcohol/water mixture is distilled off and at the same time replaced, based on weight, with distilled, demineralized or deionized water. The distillation is conducted over at least 10 hours until the top product of the distillation column ultimately contains only water, i.e. is essentially free of alcohol. The target product is suitably obtained in the distillation bottoms and can, for example, be diluted with demineralized or distilled water and advantageously adjusted to the desired active ingredient content.

Aqueous compositions prepared in accordance with the invention are clearly different from compositions known from the prior art; for instance, compositions according to the invention and those prepared by the process according to the invention are essentially free of epoxy-functional silicon compounds, they are storage-stable and especially also feature very good performance properties, i.e. properties that have been improved once again, in epoxy resin formulations.

Thus, the present invention also provides an aqueous composition obtainable by the process according to the invention.

The present invention further provides for the use of a composition according to the invention or of a composition prepared or obtainable by the process according to the invention as a component in epoxy resin formulations, as a coupling reagent in primer solutions, as a sealant on inorganic substrates, as a reactant binder and as a co-binder.

The present invention is elucidated in detail by the examples which follow, without restricting the subject-matter of the invention:

Having generally described this invention, a further understanding can be obtained by reference to certain specific examples which are provided herein for purposes of illustration only, and are not intended to be limiting unless otherwise specified.

EXAMPLES

Chemicals Used:
Dynasylan® GLYMO (3-glycidyloxypropyltrimethoxysilane), Evonik Industries
85% formic acid, BCD Chemie
Araldur 3986, BBC00235V1 Huntsman
Araldite PZ 3961-1, AAC0250900 Huntsman
Analytical Methods:
NMR Measurements:
Instrument: Bruker
Frequency: 500.1 MHz ($^1$H NMR); 99.3 MHz ($^{29}$Si NMR)
Scans: 32 ($^1$H NMR); 2000 ($^{29}$Si NMR)
Temperature: 303 K
Solvent: DMSO
Standard: tetramethylsilane
Viscosity Determination:
The viscosity was determined at 25° C. according to DIN 53019.
Determination of Layer Thickness of the Coatings:
The layer thickness of the cured coatings was determined with a Fischer Dualscope MP4C layer thickness measuring instrument with the EGAB 1.3 measurement probe.

Example 1 (Comparative Example from EP0832911)

354.0 g of GLYMO were initially charged in a 1 l stirred apparatus with reflux condenser, metering apparatus and distillation system. 81.0 g of distilled water and 1.8 g of formic acid were metered in within 15 minutes. The mixture was stirred at 60° C. for 2 h. Subsequently, within 8 h, a methanol/water mixture was distilled off and, at the same time, based on weight, replaced by water (pressure: 300-133 mbar, temperature: 42-52° C.). Thereafter, the distillation was ended and then an appropriate amount of distilled water was added, so as to form a solution with w(GLYMO)=40% in water.

$^1$H NMR measurement of intact epoxy groups: 23 mol %
$^1$H NMR (500.1 MHz, DMSO) δ [ppm]=0.49 (m; cf. FIG. 1 positions 2a and 2b; CH$_2$—Si was used as reference), 1.58 (m), 2.52 (m; cf. FIG. 1 position 7a; overlapping with DMSO), 2.72 (m; cf. FIG. 1 position 7b), 3.0 (m; cf. FIG. 1 position 6), 3.35 (m), 3.79 (m), 4.73 (d), 6.59 (m), 8.15 (s)

FIG. 1: Positions in Hydrolysed GLYMO

The signal at 0.49 (cf. FIG. 1 positions 2a and 2b) is used as reference for the sum total of all epoxysilanes used (correction by factor of 0.5, since there are 2 protons on the carbon atom). The signal at the shift of 2.73 (cf. FIG. 1 position 7b) corresponded to one of the two protons on the epoxy group. The integral at this shift has to be divided by the corrected integral at 0.49 (cf. FIG. 1 position 2a) and multiplied by 100.

The value obtained corresponded to the number of intact epoxy groups in mol % in the silane or the hydrolysis product.

$^{29}$Si NMR: (99.3 MHz, DMSO) δ [ppm]=−40.48 (silane), −49.51 (M structure), −57.75 (D structure), −67.15 (T structure)

Example 2 (Comparative Example from EP0892911)

A 1 l stirred apparatus with a distillation system is initially charged with 708 g of Dynasylan® GLYMO. 162 g of water and 3.5 g of formic acid (85%) were mixed and metered in within 15 minutes. In the course of this, the temperature rose from about 20° C. to 35° C.

The mixture was stirred at 60° C. for two hours. Thereafter, within 8 h, a methanol/water mixture was distilled off and, at the same time, based on weight, replaced by demineralized water (pressure: 300-133 mbar, temperature: 40-52° C.). Thereafter, the distillation was ended and an appropriate amount of demineralized water was added so as to form a solution with w(GLYMO)=40% in water.

$^1$H NMR measurement of intact epoxy groups: 18 mol %
$^1$H NMR (500.1 MHz, DMSO) δ [ppm]=0.48 (m; cf. FIG. 1 positions 2a and 2b; CH$_2$—Si was used as reference), 1.57 (m), 2.73 (m; cf. FIG. 1 position 7b), 3.0 (m; cf. FIG. 1 position 6), 3.35 (m), 3.74 (m), 4.76 (d), 6.61 (m), 8.15 (s)
$^{29}$Si NMR: (99.3 MHz, DMSO) δ [ppm]=−39.12 (silane), −48.57 (M structure), −57.23 (D structure), −66.75 (T structure)

Example 3 (Comparative Example from WO91/19656)

To 200 ml of demineralized water were added dropwise 12 ml of Dynasylan® GLYMO while stirring and monitoring the pH with a glass electrode, in the course of which the pH of the mixture was lowered from 10 to between 5.5 and 5.8 by dropwise addition of 3 N KOH.

Subsequently, a sufficient amount of water was added that the solution had a solids content of about 5%.

$^1$H NMR measurement of intact epoxy groups: 95 mol %.
$^1$H NMR (500.1 MHz, DMSO) δ [ppm]=0.49 (m; cf. FIG. 1 positions 2a and 2b; CH$_2$—Si is used as reference), 1.58 (m), 2.52 (m; cf. FIG. 1 position 7a; overlapping with DMSO), 2.72 (m; cf. FIG. 1 position 7b), 3.0 (m; cf. FIG. 1 position 6), 3.35 (m), 3.79 (m), 4.73 (d), 6.59 (m), 8.15 (s)

$^{29}$Si NMR: (99.3 MHz, DMSO) δ [ppm]=−39.32 (silane), −48.73 (M structure), −57.11, −58.31 (D structure)

Example 4 (Inventive)

354.0 g of GLYMO were initially charged in a 1 l stirred apparatus with reflux condenser, metering apparatus and distillation system. 81.0 g of distilled water and 2.2 g of formic acid were metered in within 15 minutes. The mixture was stirred at 60° C. for two hours. Subsequently, within 10 h, a methanol/water mixture was distilled off and, at the same time, based on weight, replaced by water (pressure: 300-133 mbar, temperature: 42-52° C.). Thereafter, the distillation was ended and an appropriate amount of water was added so as to form a solution with w(GLYMO)=40% in water.

$^{1}$H NMR measurement of intact epoxy groups: 0 mol %

$^{1}$H NMR (500.1 MHz, DMSO) δ [ppm]=0.53 (m; cf. FIG. 1 positions 2a and 2b; CH$_2$—Si is used as reference), 1.57 (m), 3.55 (m), 4.63 (d)

$^{29}$Si NMR: (99.3 MHz, DMSO) δ [ppm]=−39.57 (silane), −49.04 (M structure), −57.37 (D structure), −67.56 (T structure)

Example 5 (Inventive)

1354 g of distilled water were initially charged in a 2 l stirred apparatus with a metering apparatus and reflux condenser, and 2.0 g of formic acid (85%) were added. The metering apparatus was used to add 300 g of Dynasylan® GLYMO within 10 minutes. The mixture was subsequently stirred at 65° C. for four hours. Subsequently, within 10 h, a methanol/water mixture was distilled off and, at the same time, based on weight, replaced by water (pressure: 300-133 mbar, temperature: 42-52° C.). Thereafter, the distillation was ended and an appropriate amount of water was added so as to form a solution with w(GLYMO)=40% in water.

$^{1}$H NMR measurement of intact epoxy groups: 0 mol %

$^{1}$H NMR (500.1 MHz, DMSO) δ [ppm]=0.70 (m; cf. FIG. 1 positions 2a and 2b; CH$_2$—Si is used as reference), 1.72 (m), 3.57 (m), 4.73 (d)

$^{29}$Si NMR: (99.3 MHz, DMSO) δ [ppm]=−53.08 (D structure), −46.92 (T structure)

Example 6: (Performance Tests)

Salt Spray Test According to DIN EN ISO 9227:
Substrates:
DC 01 C290 steel test specimens
Cleaning of the Metal Substrates:

The steel test specimens were immersed into a cleaning bath consisting of 10 g of Ridoline C 72 (Henkel AG) and 1000 g of demineralized water at 60° C. for 2 minutes and then rinsed with demineralized water.

TABLE 1

Application-related formulations with a 2-component epoxy resin system

| Components[1] | Formulation 1 [g] | Formulation 2 [g] | Formulation 3 [g] |
|---|---|---|---|
| Araldite PZ 3961-1 | 92.0 | 92.0 | 92.0 |
| Aradur 3986 | 38.4 | 38.4 | 38.4 |
| Dist. H$_2$O | 28.8 | 28.8 | 28.8 |

TABLE 1-continued

Application-related formulations with a 2-component epoxy resin system

| Components[1] | Formulation 1 [g] | Formulation 2 [g] | Formulation 3 [g] |
|---|---|---|---|
| Aqueous composition from (comparative) example 1 | — | — | 1.44 |
| Aqueous composition from inventive example 4 | — | 1.44 | — |

[1]Araldite PZ-3961 was formulated together with the Aradur 3986-1, dist. H$_2$O and the aqueous silane system.

Application of the Epoxy Resin Formulations to the Substrates:

The respective aqueous epoxy resin formulation (cf. Table 1) was applied with a 40 μm spiral applicator to the cleaned steel sheets (substrate) and cured at 80° C. for 20 minutes. The dry layer thicknesses of the coatings were 14-18 μm.

After 1 day, the coated steel sheets were tested in the neutral salt spray test according to DIN EN ISO 9227.

The assessment of the delamination proceeding from a scribe was conducted according to ISO 4628-8 and the assessments are compiled in Table 2.

TABLE 2

Results from the studies of the coated substrates after 56 hours in salt spray mist (DIN EN ISO 9227):

| Result from application test with | Delamination at the scribe of the coated substrate in [mm] |
|---|---|
| Formulation 1 | 15 |
| Formulation 2 | 5 |
| Formulation 3 | 10 |

Result:

Formulation 2 comprising the aqueous composition from inventive example 4 shows delamination of 5 mm at the scribe. By contrast, formulation 3 comprising the aqueous composition from comparative example 1 shows delamination of 10 mm, and formulation 1 without the addition of a silane system delamination of 15 mm.

Storage Stability of the Formulations:

For practical use, minimum complexity is important. Formulations that the end user has to mix should as far as possible consist only of 2 components. Multicomponent systems have a higher risk of an incorrect composition on mixing. The formulations tested could consist of 3 components: the epoxy resin (Araldite PZ 3961-1), the amine hardener (Aradur 3986) and the aqueous silane system. However, a simpler system composed of 2 components would be much simpler for the end user to handle. In order to test this, the shelf lives of formulations 1 to 3 were examined. For this purpose, the amine hardener (Aradur 3986) was mixed in each case with the aqueous silane system from (comparative) example 1 and from inventive example 4 in the amounts shown in Table 1, and the viscosity of the formulations was measured at time intervals. The results are compiled in Table 3.

TABLE 3

| | Viscosity | | |
|---|---|---|---|
| Measurement after [minutes] | Viscosity of a formulation composed of 38.4 g of Aradur 3986 + 1.44 g of composition composed of (comparative) example 1 [mPa s] | Viscosity of a formulation composed of 38.4 g of Aradur 3986 + 1.44 g of composition from example 4 [mPa s] | Viscosity of Aradur 3986 [mPa s] |
| 0 | 4.96 | 4.96 | 17.70 |
| 51 | 5.38 | 4.96 | 17.70 |
| 81 | 13.77 | 4.96 | 17.70 |
| 119 | 31.92 | 4.91 | 17.70 |
| 158 | 93.82 | 4.89 | 17.70 |
| 192 | 266.33 | 4.88 | 17.70 |
| 226 | 775.33 | 4.88 | 17.70 |

Result:

While the formulation composed of Aradur 3986 with the aqueous composition from (comparative) example 1 shows a distinct rise in viscosity after only 51 minutes, which rises to 775 mPa s after 226 minutes, the mixture comprising the inventive aqueous composition from example 4 shows a constant viscosity, like the pure Aradur 3986 product.

European patent application 15198353.3 filed Dec. 8, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A composition, comprising:
   water; and
   a mixture of [3-(2,3-dihydroxyprop-1-oxy)propyl]silanol oligomers and ethers thereof;
   wherein the proportion of epoxy groups bound within Si compounds which may be present in the composition is not more than 0.05 mol of epoxy groups per mole of Si in the composition; and
   wherein the composition comprises [3-(2,3-dihydroxyprop-1-oxy)propyl]silanol oligomers or ethers thereof of the general formula I

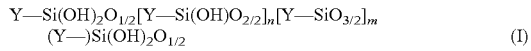

$$Y—Si(OH)_2O_{1/2}[Y—Si(OH)O_{2/2}]_n[Y—SiO_{3/2}]_m(Y—)Si(OH)_2O_{1/2} \quad (I)$$

wherein n>0 and m>0, Y groups are R"O—CH$_2$—CH(OR')—CH$_2$—O—C$_3$H$_6$— and the R' and R" groups are the same or different and may be H, methyl and ethyl and
   optionally comprises silanols of the general formula II

$$Y—Si(OH)(OR)_2 \quad (II)$$

wherein Y group is R"O—CH$_2$—CH(OR')—CH$_2$—O—C$_3$H$_6$— and the R, R' and R" groups are the same or different and may be H, methyl and ethyl.

2. The composition according to claim 1,
   wherein the proportion of epoxy groups bound within Si compounds which may be present in the composition is 0 to 0.04 mol of epoxy groups per mole of Si in the composition.

3. The composition according to claim 1,
   wherein the composition has an active ingredient content of compounds of the formula I including compounds of the formula II of up to 80% by weight, based on the overall composition.

4. The composition according to claim 1,
   wherein the composition has been acidified and contains formic acid or acetic acid.

5. The composition according to claim 1,
   wherein the composition contains not more than 1% by weight of free alcohol, wherein the % by weight figure is based on the composition and the alcohol is selected from the group of methanol and ethanol.

6. The composition according to claim 1,
   wherein the composition is water-dilutable.

7. A component in an epoxy resin formulation, a coupling reagent in a primer solution, a sealant on an inorganic substrate, a reactive binder or a co-binder, comprising:
   the composition according to claim 1.

8. A process for producing a composition comprising:
   water; and
   a mixture of [3-(2,3-dihydroxyprop-1-oxy)propyl]silanol oligomers and ethers thereof;
   wherein the proportion of epoxy groups bound within Si compounds which may be present in the composition is not more than 0.05 mol of epoxy groups per mole of Si in the composition,
   said process comprising:
   1) combining 3-glycidyloxypropyltrimethoxysilane or 3-glycidyloxypropyltriethoxysilane or a mixture of 3-glycidyloxypropyltrimethoxysilane and 3-glycidyloxypropyltriethoxysilane as 3-glycidyloxypropyltrialkoxysilane and mixing it in the presence of an acid with a defined amount of distilled, demineralized or deionized water within 10 to 30 minutes,
   2) heating the reaction mixture and stirring it at 55 to 70° C. for 1.5 to 5 hours,
   3) then, under reduced pressure at a temperature in the range from 40 to 55° C. over at least 10 hours, distilling an alcohol/water mixture and at the same time replacing it, based on weight, with distilled, demineralized or deionized water and conducting the distillation over at least 10 hours until the top product of the distillation column ultimately contains only water.

9. The process according to claim 8,
   wherein, in 1, the 3-glycidyloxypropyltrialkoxysilane and water are used in a molar ratio of 1:3 to 60.

10. The process according to claim 8,
    wherein, in 1, the acid used is formic acid or acetic acid in a molar ratio to 3-glycidyloxypropyltrialkoxysilane of 0.03 to 0.06:1.

11. An aqueous composition obtainable according to the process of claim 8.

12. An aqueous composition obtained by a process comprising:
    1) combining 3-glycidyloxypropyltrimethoxysilane or 3-glycidyloxypropyltriethoxysilane or a mixture of 3-glycidyloxypropyltrimethoxysilane and 3-glycidyloxypropyltriethoxysilane as 3-glycidyloxypropyltrialkoxysilane and mixing it in the presence of an acid with a defined amount of distilled, demineralized or deionized water within 10 to 30 minutes,
    2) heating the reaction mixture and stirring it at 55 to 70° C. for 1.5 to 5 hours,
    3) then, under reduced pressure at a temperature in the range from 40 to 55° C. over at least 10 hours, distilling an alcohol/water mixture and at the same time replacing it, based on weight, with distilled, demineralized or deionized water and conducting the distillation over at least 10 hours until the top product of the distillation column ultimately contains only water.

* * * * *